United States Patent [19]
Petreye et al.

[11] Patent Number: 5,635,914
[45] Date of Patent: Jun. 3, 1997

[54] METHOD AND APPARATUS FOR DYNAMIC GROUP CALLING IN A SELECTIVE CALL SYSTEM

[75] Inventors: David R. Petreye, Lake Worth; David F. Willard, Plantation; Barbara D. Laflin, Boynton Beach; Marcus A. Gade, Boca Raton, all of Fla.

[73] Assignee: Motorola, Inc., Schaumburg, Ill.

[21] Appl. No.: 516,724

[22] Filed: Aug. 18, 1995

Related U.S. Application Data

[63] Continuation of Ser. No. 229,070, Apr. 18, 1994, abandoned, which is a continuation of Ser. No. 890,909, May 29, 1992, abandoned.

[51] Int. Cl.$^6$ .................................................. H04Q 1/00
[52] U.S. Cl. ........................... 340/825.44; 340/825.52; 340/825.47
[58] Field of Search ................ 340/825.44, 825.47, 340/825.52; 455/38.1

[56] References Cited

U.S. PATENT DOCUMENTS

| | | | |
|---|---|---|---|
| 4,110,743 | 8/1978 | Zahnd | 340/825.47 |
| 4,369,443 | 1/1983 | Giallanza et al. | 340/825.47 |
| 4,427,980 | 1/1984 | Fennell et al. | |
| 4,668,949 | 5/1987 | Akahori et al. | |
| 4,760,572 | 7/1988 | Tomikawa | |
| 4,845,491 | 7/1989 | Fascenda et al. | 340/825.47 |
| 4,873,519 | 10/1989 | Matai et al. | 340/825.47 |
| 4,916,539 | 4/1990 | Galumbeck | 340/825.47 |
| 5,089,813 | 2/1992 | Deluca et al. | 340/825.44 |
| 5,128,665 | 7/1992 | DeLuca et al. | |

OTHER PUBLICATIONS

European Telecommunications Standards Institute, *Paging Systems; European Message System (ERMES), Part 4: Air Interface Specification* (prETS 300 133-4) 1991, p. 21, sec. 6.5.1.2.4. (no month).

European Technical Standards Institute (ETSI), Paging Systems Committee, Norway Delegation, "A Possible Table/Stepping Solution", RES4/RSS(88)-77, Nov. 8-11, 1988.

European Technical Standards Institute (ETSI), Paging Systems Committee, Norway Delegation, "Properties for a Fully Loaded Spread Addressing Solution", RES4/RSS(89)-28, Mar. 13-17, 1989.

*Primary Examiner*—Brian Zimmerman

[57] ABSTRACT

A selective call system provides dynamic group calling by transmitting a paging message (FIG. 10) to each data communication receiver in a defined group. The paging message comprises a group call address (1040) and frame (1050) and phase (1060) information identifying when the group message will be transmitted. The group call message is then transmitted (326, 328) in the assigned frame and phase. When the paging messages comprising the group call address are received (1904) by the data communication receivers, the group call address is decoded and temporarily stored (1910) as an address of the receiver. Within the identified frame and phase, address correlation with the group call address is attempted (1918, 1926) and the group call message, when found (1920), is received and decoded (1922) as a paging message. After reception of the group call message, the group call address and associated stored information is erased (1924).

6 Claims, 11 Drawing Sheets

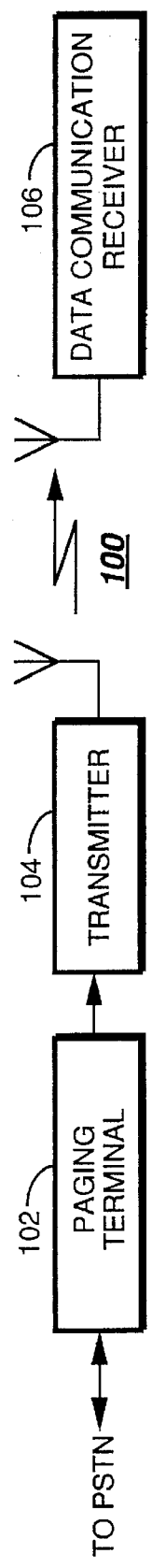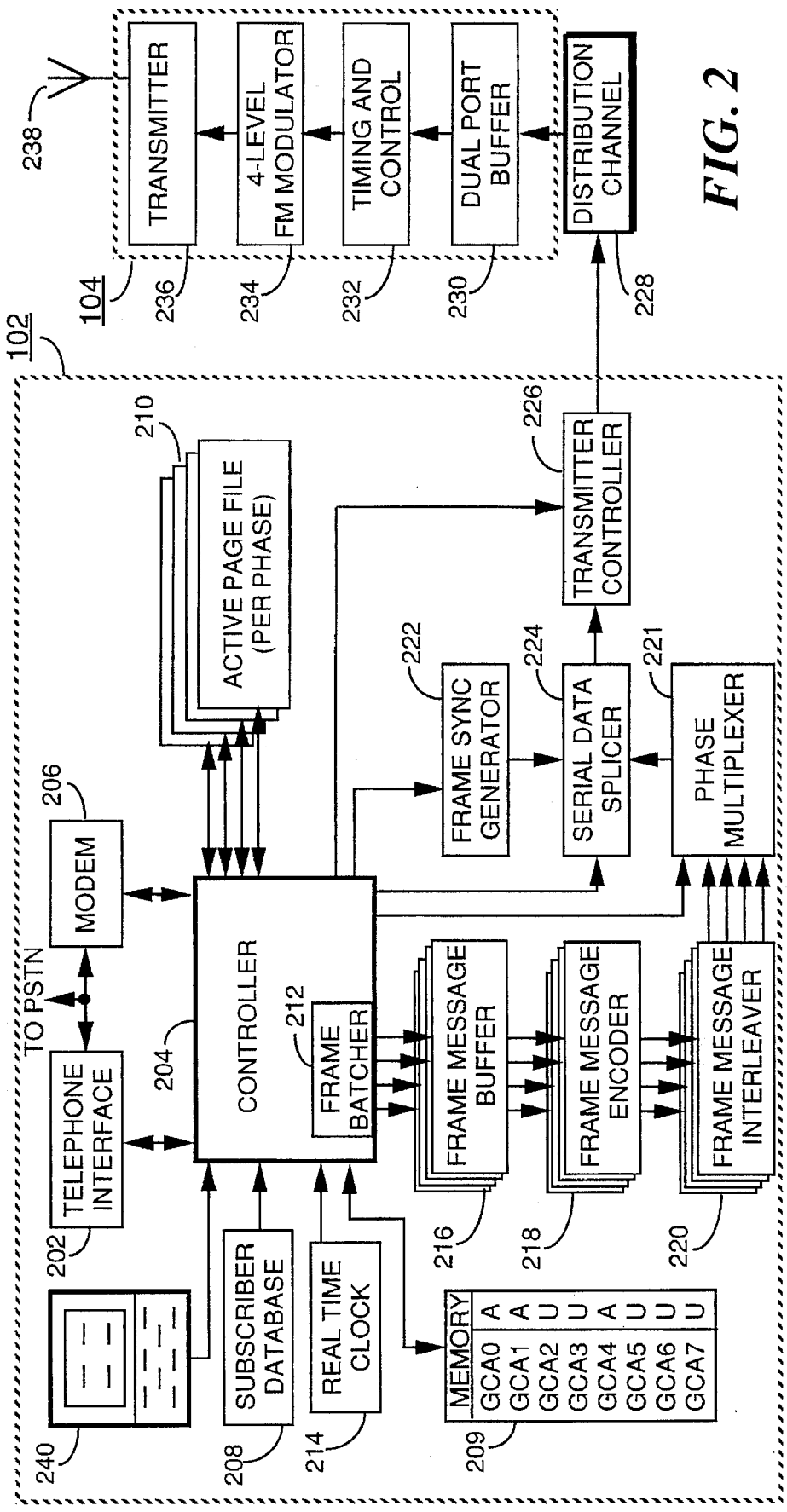
FIG. 1
FIG. 2

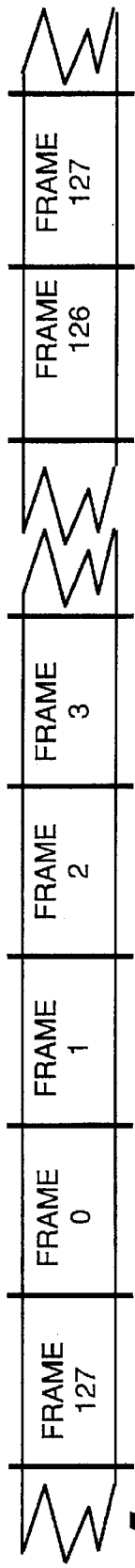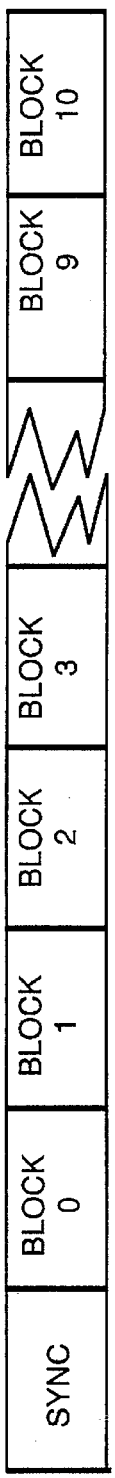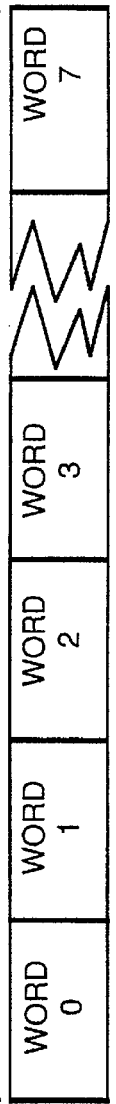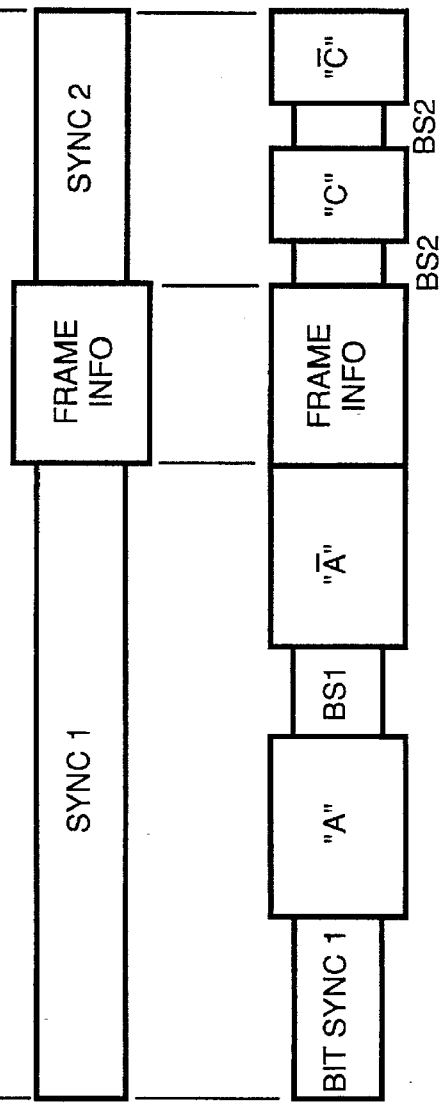

5,635,914

1

METHOD AND APPARATUS FOR DYNAMIC GROUP CALLING IN A SELECTIVE CALL SYSTEM

This is a continuation of Ser. No. 08/229,070 filed Apr. 18, 1994, now abandoned, which was a continuation of Ser. No. 07/890,909 filed May 29, 1992, now abandoned.

FIELD OF THE INVENTION

The present invention relates generally to the field of selective call communications, and more particularly to a method and apparatus in a selective call system for dynamic group calling.

BACKGROUND OF THE INVENTION

A selective call system provides transmission of selective call messages from a message originator to a selective call receiver. The originator contacts a selective call terminal and provides the content of the message and information identifying the intended receiver thereto. The selective call terminal encodes the message into one of several known protocols, such as the POCSAG signalling code. In addition, the terminal appends an address assigned to the selective call receiver to the message. The address and message are then modulated onto a selective call signal and transmitted from the selective call terminal. When the selective call receiver recognizes its address within the selective call signal, the message therefollowing is demodulated and decoded.

It is more economical for a selective call system service provider to have denser selective call traffic (i.e., a greater number of messages transmitted per hour). Therefore, if a single message is to be transmitted to a number of selective call receivers, the option of group calling is appealing to the service provider. There are two types of group calling: radio group calling and terminal group calling. Radio group calling requires an additional group address to be permanently assigned to receivers within a group. Radio group calling provides the greatest savings in air time in that a single address and message can be provided to multiple receivers within a group. Yet, radio group calling is inflexible. To change the receivers assigned to the group, the receivers would need to be reprogrammed to remove or add the group address.

Terminal group calling is more dynamic in that the members of the group can be defined at the terminal as a message is prepared for transmission. One example of terminal group calling is the multiple addressing of voice messages in the Golay Sequencing Code signalling protocol. Yet, terminal group calling does not result in substantial air time savings for the service provider. At a minimum, multiple addresses need to be transmitted from the terminal and, in some terminal group calling schemes, the message also needs to be sent a number of times.

Thus what is needed is a method and apparatus for dynamic group calling allowing for the receivers assigned to a group to be easily reassigned while providing substantial savings in air time.

SUMMARY OF THE INVENTION

In accordance with the objects of the present invention, in one aspect there is provided a selective call system comprising an input device for receiving group call information, the group call information comprising a group call message and group call subscriber information. The selective call system also comprises a first memory for storing a plurality

2 of group call addresses, a second memory for storing a plurality of selective call addresses and subscriber information corresponding to each of the plurality of selective call addresses, and a controller coupled to the input device, the first memory device, and the second memory device, for assigning one of the plurality of group call addresses to the group call message and for comparing the subscriber information stored in the second memory to the group call subscriber information and composing in response thereto a plurality of selective call messages, each of the selective call messages comprising the group call address and one of the plurality of selective call addresses determined in response to the group call subscriber information. The selective call system also comprises a transmitter coupled to the controller for transmitting the plurality of selective call messages and thereafter transmitting the group call message associated with the group call address assigned thereto.

In accordance with another aspect of the present invention there is provided a selective call receiver having at least one selective call address assigned thereto. The selective call receiver comprises receiver circuitry for receiving a selective call signal, a first memory for storing the at least one selective call address assigned to the selective call receiver, an address correlator coupled to the first memory means and the receiver means for determining whether the selective call signal comprises signals correlating to one of the at least one selective call address, a decoder coupled to the address correlator for decoding a selective call message in response to the address correlator determining that the selective call signal comprises signals correlating to one of the at least one selective call address, and a second memory coupled to the decoder for storing the selective call message. The selective call receiver also comprises a controller coupled to the second memory and the address correlator for determining whether the selective call message is a group call address and for providing the group call address to the address correlator as one of the at least one selective call address in response to determining the selective call message is a group call address.

BRIEF DESCRIPTION OF THE DRAWING

FIG. 1 is an electrical block diagram of a data transmission system in accordance with the preferred embodiment of the present invention.

FIG. 2 is an electrical block diagram of a terminal for processing and transmitting message information in accordance with the preferred embodiment of the present invention.

FIGS. 5, 6, and 7 are timing diagrams illustrating the transmission format of the signaling protocol utilized in accordance with the preferred embodiment of the present invention.

FIGS. 8 and 9 are timing diagrams illustrating the synchronization signals utilized in accordance with the preferred embodiment of the present invention.

DETAILED DESCRIPTION OF THE INVENTION

Figure 3:
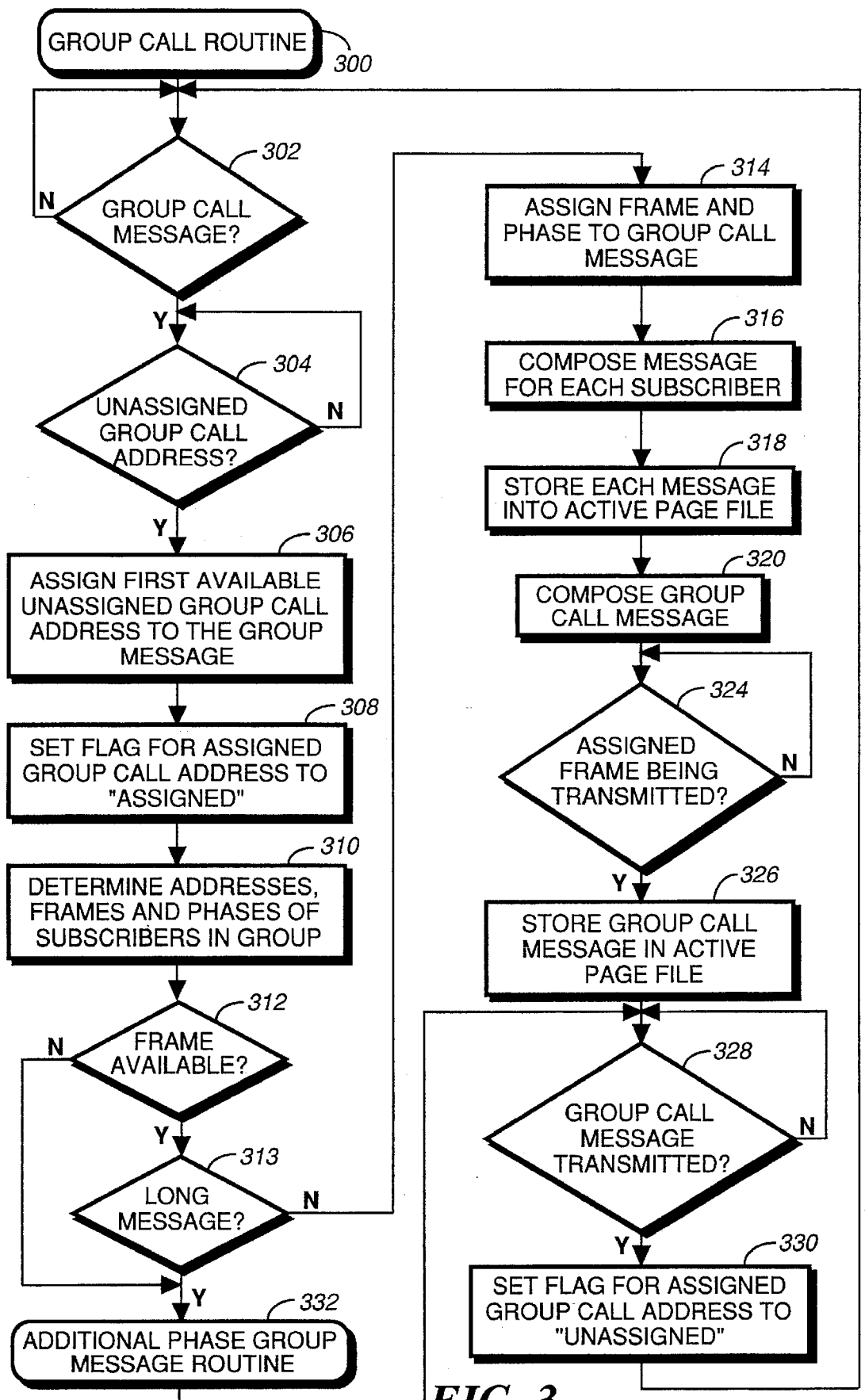
FIGS. 3 and 4 are a flow chart of the operation of the terminal of FIG. 2 in accordance with the preferred embodiment of the present invention.

FIG. 1 is an electrical block diagram of a data transmission system 100, such as a paging system, in accordance with the preferred embodiment of the present invention. In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104 preferably simulcast transmit the message information to data communication receivers 106. Processing of the numeric and alphanumeric information by the paging terminal 102, and the protocol utilized for the transmission of the messages is described below.

FIG. 2 is an electrical block diagram of the paging terminal 102 utilized for processing and controlling the transmission of the message information in accordance with the preferred embodiment of the present invention. Short messages, such as tone-only and numeric messages which can be readily entered using a Touch-Tone telephone are coupled to the paging terminal 102 through a telephone interface 202 in a manner well known in the art. Longer messages, such as alphanumeric messages which require the use of a data entry device are coupled to the paging terminal 102 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to such information as addresses assigned to the data communication receiver, message type associated with the address, and information related to the status of the data communication receiver, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber database 208 also includes such information as to what transmission frame and to what transmission phase the data communication receiver is assigned, as will be described in further detail below.

In accordance with the present invention, the paging terminal 102 further comprises a memory 209 for storing a listing of addresses reserved for group calls. The preferred embodiment of the present invention reserves eight addresses (GCA0 to GCA7) for group call messaging. Each of the group call addresses (GCA0 to GCA7) has corresponding information stored therewith indicating whether the group call address is assigned (A) or unassigned (U). The controller 204 is coupled to the memory 209 and temporarily assigns the group call addresses, utilizing the stored addresses for group call messaging as described in further detail below.

The received message is stored in an active page file 210 which stores the messages in queues according to the transmission phase assigned to the data communication receiver. Longer data messages may require fragmentation of the message into several messages for transmission. The several messages are stored in the active page file 210 for transmission in a manner which allows the receiver to reconstruct the long message from the several messages. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batcher 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame message encoder 218, again maintaining the phase queue relationship. The frame message encoder 218 encodes the address and message information into address and message code words required for transmission, as will be described below. The encoded address and message code words are ordered into blocks and then coupled to a frame message interleaver 220 which interleaves preferably eight code words at a time for transmission in a manner well known in the art. The interleaved code words from each frame message interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

Figure 4:
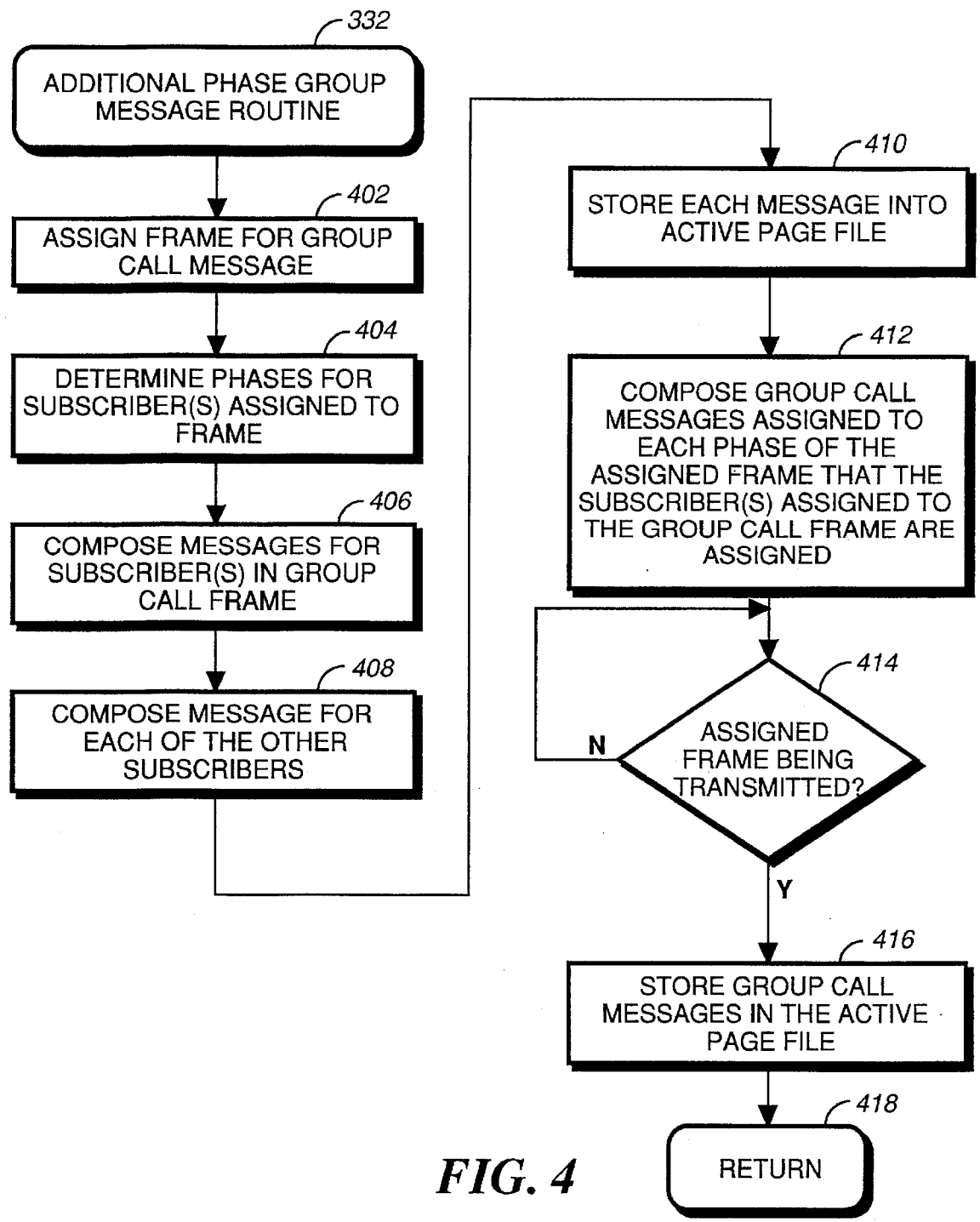

FIGS. 3 and 4 are a flow chart of the group call routine of the controller 204 in accordance with the preferred embodiment of the present invention. The group call routine 300 begins by examining the input from the telephone interface 202 and the modem 206 to determine if a group call message has been received 302. Until a group call message is received 302, the group call routine 300 is not accessed and operation of the controller 204 proceeds as described above.

When a group call message is received 302, the controller 204 examines the memory 209 to determine 304 whether an unassigned group call address is in the memory 209. As described above, each of the group call addresses within the memory 209 has corresponding information stored therewith indicating whether the address is assigned or unassigned. If processing determines there are no unassigned group call addresses 304, processing in accordance with the group call routine will await a group call address being flagged "unassigned" as described hereinafter.

If it is determined 304 that the memory 209 has an unassigned group call address, the first available unassigned group call address is assigned 306 to the group message. The assigned group call address is then flagged 308 in the memory 209 to indicate that the address is "assigned".

In accordance with the present invention, a group call message received by the telephone interface 202 or the modem 206 by the controller 204 comprises group message information and group subscriber information, the group subscriber information identifying the subscribers to be assigned to the group or a section of the group message information. Thus, it can be seen that the present invention allows truly dynamic group calling in that the message originator can specify the subscribers who make up the group or reception of a group call message.

Referring back to FIG. 3, processing determines 310 the addresses, frames, and phases of the subscribers in the group as indicated by the group call message. Processing examines the frames of the subscribers in the group to determine 312 whether a frame to which no subscriber in the group is assigned is available for assigning the group call message. If there is a frame available 312, processing additionally determines whether the message is a long message 313. As described above, long messages must necessarily be fragmented to allow for transmission within the parameters of the frame structure by transmitting the long messages as a plurality of messages in a plurality of frames. This may also hold true for other signaling protocols where fragmentation of lengthy messages allows other selective call messages to be transmitted in a timely manner. The message being transmitted in multiple frames requires special treatment as described below.

If a frame is available 312 and the message is not a long message 313, the group call message is assigned to the available frame and a phase of that frame 314. A paging message is then composed 316 for each subscriber of the group. The paging message comprises information indicating the assigned group call address and the frame and phase assigned for the group call message. Each of the subscriber paging messages are stored 318 into the active page file 210. The controller 204 retrieves each message from the active page file 210 and processes it for transmission as described above. After the subscriber messages are stored 318, the group call message is composed 320. The group call message comprises the group call address and the group call message information. Processing determines whether the frame assigned for the group call message is being transmitted 324. If the assigned frame is not being transmitted 324, processing awaits until the assigned frame is transmitted and then stores 326 the group call message in the active page file 210. Awaiting transmission of the assigned frame allows for a full cycle of the synchronous selective call signal of the present invention (as described below) to be transmitted such that all the subscriber paging messages will be transmitted before the group call message is transmitted. The controller 204 retrieves the group call message from the active page file 210, treating it as another paging message, and processes it for transmission by the transmitter 104 as described hereinabove.

After storing the group call message in the active page file 326, the group call routine of the controller 204 awaits transmission of the group call message 328. After the group call message is transmitted 328, the controller 204 accesses the memory 209 to flag the assigned group call address to indicate "unassigned" 330 such that the group call address will be available for subsequent received group call messages 302. Processing then returns to await a subsequent group call message 302.

If the subscribers of a group occupy all the frames of the selective call signal, then a frame is unavailable 312 and an additional phase group message routine 332 is performed. Also, if the message is a long message 313, the additional phase group message routine 332 is performed. A frame containing the least number of subscribers is assigned 402 for the group call message. If the message is a long message, a number of frames following the assigned 402 frame are also assigned to transmit the message, the number of frames dependent upon the number of messages resulting from the fragmentation of the long message. The phases for the subscriber or subscribers assigned to the assigned frame(s) are determined 404 such that paging messages for the subscribers in the group call frame(s) will be received within the same phases as the phases assigned to the subscribers of the assigned frame(s). The paging messages are composed 406 to provide information to the subscriber or subscribers permanently assigned to the frame assigned as the group call frame. The paging messages indicate the group call address, the assigned group frame (for multiple frame lengthy messages, the assigned group frame of the paging messages is the first of the assigned group frames), and the phase as described above. The phase assigned in a frame to which the receiver is assigned will be the phase upon which the receiver receives paging messages in that frame. Additionally, paging messages are composed 408 for the subscribers not assigned to the assigned group call frame, these paging messages indicating the group call address, the assigned group call frame or first assigned group frame, and an assigned phase of the group call message. All of the paging messages are then stored 410 into the active page file 210. Multiple group call messages are then composed 412 for assignment to the multiple phases of the assigned frame (s) such that each phase of the assigned frame(s) that a subscriber or subscribers are assigned to has a group call message assigned thereto. For long messages, the multiple group call messages are composed 412 for assignment to the multiple phases of the assigned frames such that each phase of any of the assigned frames that a subscriber or subscribers are assigned to has a group call message assigned thereto.

Alternatively, if all of the data communications receivers of a group include components capable of processing the multi-phase signal in a manner to decode all of the phases of a frame, a long group call message destined for such receivers could be assigned to one phase regardless of whether one of the receivers receives individual selected call messages in the frame. The multi-phase processing receivers can simultaneously monitor for the individual addresses and the group addresses on different phases within one frame. Another alternative embodiment utilizing multi-phase processing receivers could allow for a long group call message to be compressed such that in one frame, portions of the message could be transmitted on each phase. In accordance with this second alternative embodiment, the multiple group call messages would be composed 412 in such a manner as to indicate to the receiver the method to recover the long message from the multiple phases.

After the assigned group call frame(s) is transmitted 414, the group call message(s) are stored 416 in the active page file 210 and processing returns 418 to await transmission of the group call message 328 (FIG. 3).

Thus, it can be seen that in accordance with the preferred embodiment of the present invention, the single group call message can be received by multiple subscribers, the multiple subscribers being assigned to a group dynamically formed by information provided by the message originator. Savings in air time are dependent upon the length of the group call message and the number of subscribers making up the group. The larger the number of subscribers in the group, the greater savings in air time. Further, the longer the group call message, the greater the savings in air time because a relatively short paging message is sent to each of the subscribers to inform them of the group call address and transmission of the lengthy group call message, occupies much less air time than multiple transmissions of the lengthy group call message.

An additional advantage of the present invention allows for selective call receivers assigned to frames in which the group message is transmitted to be able to receive individual selective call messages intended for the receiver. A service provider could opt to provide group call message on a priority basis where the group call messages would be quickly transmitted while the transmission of individual selective call messages may be delayed. The present invention allows for individual messages to be sent within phases of the assigned group call frame without interfering with the group call message and, advantageously, the group call message is assigned to a phase or phases in such a manner as to allow the receivers to look for individual messages in the predetermined locations while looking for the group message in the assigned location of the signal protocol. The frame and phase assignment method of the present invention allows for group call messaging with minimal impact on battery saving in the receiver.

FIGS. 5, 6 and 7 are timing diagrams illustrating the transmission format of the signaling protocol utilized in accordance with the preferred embodiment of the present invention. Though the present invention is useful in several known protocols, the preferred embodiment utilizes the signaling protocol described below for dynamic group calling in accordance with the present invention resulting in substantial air time savings for the service provider. As shown in FIG. 5, the signaling protocol enables message transmission to data communication receivers, such as pagers, assigned to one or more of 128 frames which are labeled frame zero through frame 127. It then will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

As shown in FIG. 6, the frames comprise a synchronization code (sync) followed preferably by eleven blocks of message information which are labeled block zero through block ten. As shown in FIG. 7, each block of message information comprises preferably eight address, control or data code words which are labeled word zero through word seven for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word could be utilized as well. Unlike the well known POCSAG signaling protocol which provides address and data code words which utilize the first code word bit to define the code word type, as either address or data, no such distinction is provided for the address and data code words in the signaling protocol utilized with the preferred embodiment of the present invention. Rather, address and data code words are defined by their position within the individual frames.

FIGS. 8 and 9 are timing diagrams illustrating the synchronization code utilized in accordance with the preferred embodiment of the present invention. In particular, as shown in FIG. 8, the synchronization code comprises preferably three parts, a first synchronization code (sync 1), a frame information code word (frame info) and a second synchronization code (sync 2). As shown in FIG. 9, the first synchronization code comprises first and third portions, labeled bit sync 1 and BS1, which are alternating one,zero bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
| --- | --- |
| 1600 bps | A1 and A1 bar |
| 3200 bps | A2 and A2 bar |

| Bit Rate | "A" Value |
| --- | --- |
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number zero to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization at the frame transmission data bit rate.

In summary the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

Figure 10:
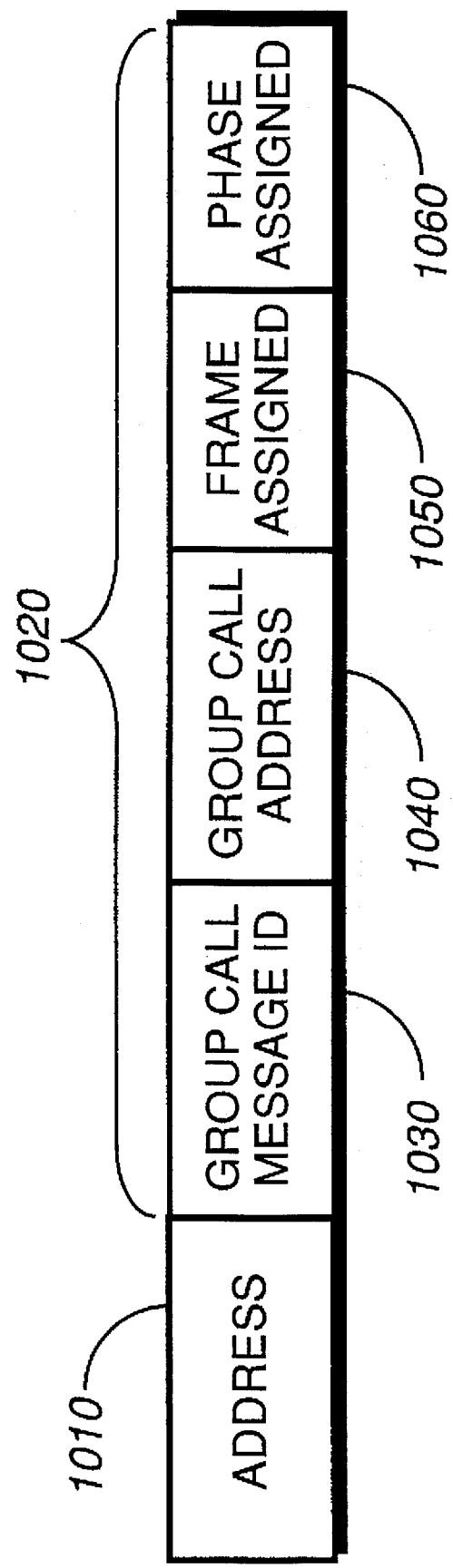
FIG. 10 is a diagram of a selective call message for dynamic group calling in accordance with the preferred embodiment of the present invention.

FIG. 10 is a diagram of the paging messages composed for transmission to the data communication receivers in the group receiving a group call message. The messages comprise an address 1010 indicating the receiver intended to receive the paging message and a message portion 1020. When the data communication receiver detects the address 1010, the message portion 1020 is received and decoded. The message portion 1020 comprises a group call message identification code 1030, and information identifying a group call address 1040, an assigned frame of the group call message 1050, and an assigned phase of the group call message 1060. The information identifying the group call address 1040 could be the group call address or could be condensed information which indicates to the receivers which of the number of predetermined group call addresses (GCA0–GCA7), stored in the receivers, is to be activated for the group call message. When the paging messages are composed 316 (FIG. 3), 406, 408 (FIG. 4), the message portion is encoded to define the information 1030, 1040, 1050, 1060. The group call message identification code 1030 identifies the message as a message having a temporary address for receiving a group call message. The group address 1040, assigned frame 1050, and assigned phase 1060 are then stored in the data communication receiver for handling as described below.

Figure 11:
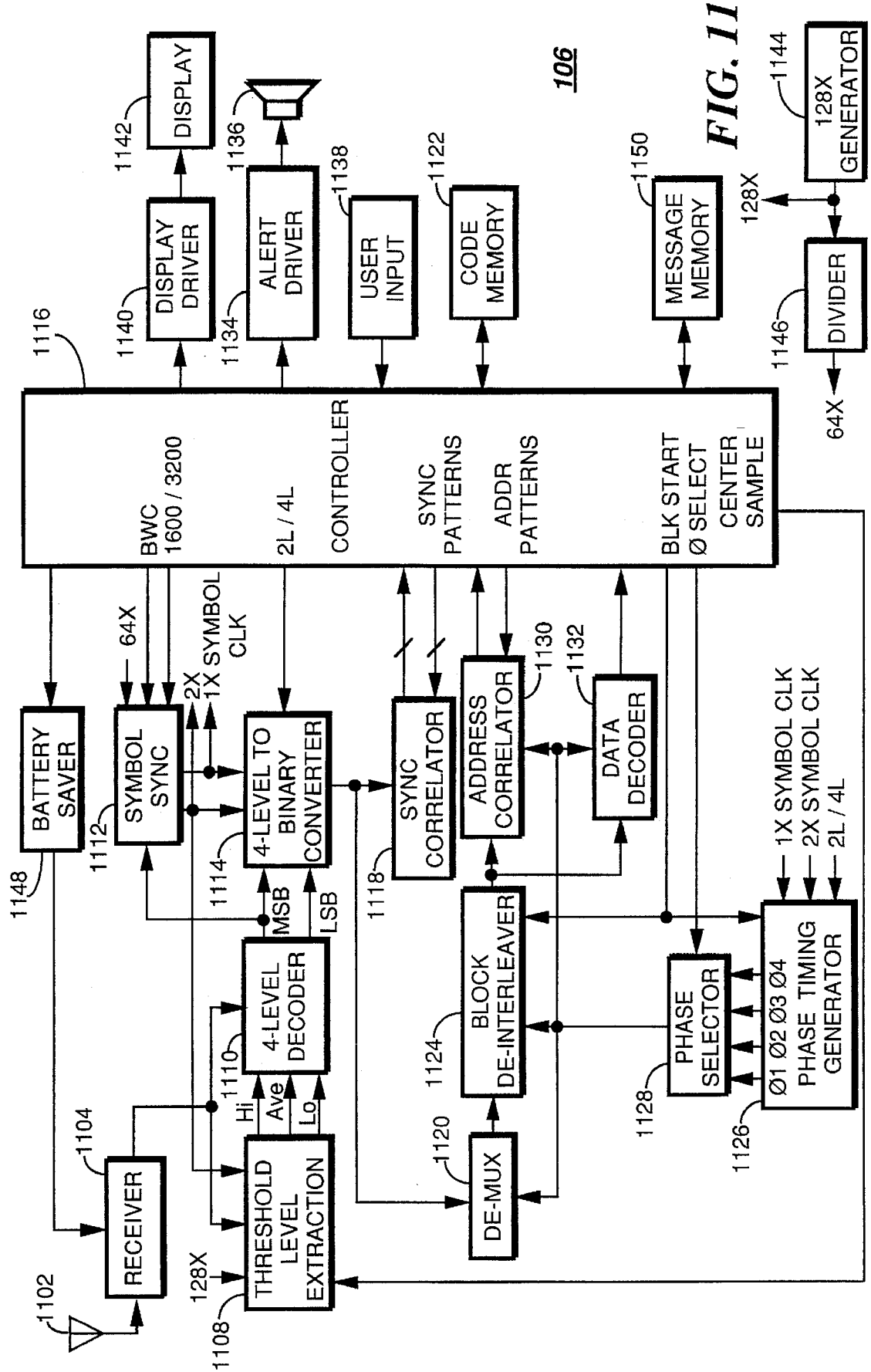
FIG. 11 is an electrical block diagram of a data communication receiver in accordance with the preferred embodiment of the present invention.

FIG. 11 is an electrical block diagram of the data communication receiver 106 in accordance with the preferred embodiment of the present invention. The heart of the data communication receiver 106 is a controller 1116, which is preferably implemented using an MC68HC05HC11 microcomputer, such as manufactured by Motorola, Inc. The microcomputer controller, hereinafter called the controller 1116, receives and processes inputs from a number of peripheral circuits, as shown in FIG. 11, and controls the operation and interaction of the peripheral circuits using software subroutines. The use of a microcomputer controller for processing and control functions is well known to one of ordinary skill in the art.

Figure 12:
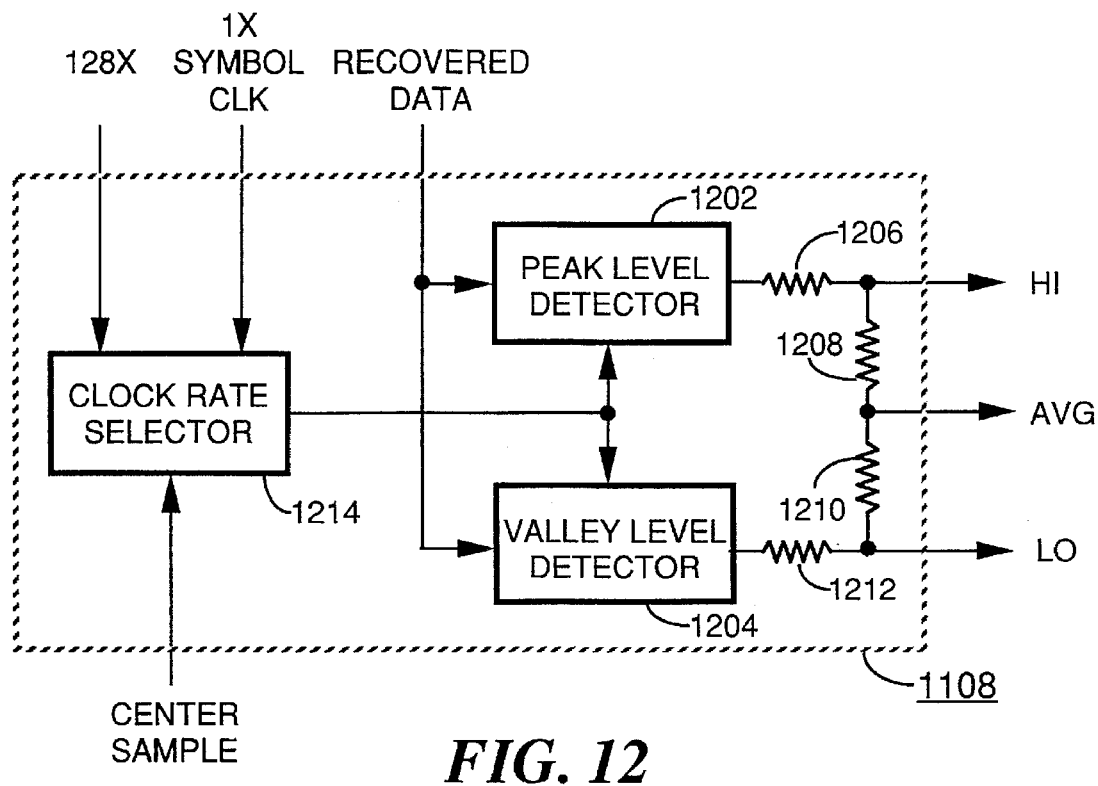
FIG. 12 is an electrical block diagram of a threshold level extraction circuit utilized in the data communication receiver of FIG. 11.

The data communication receiver 106 is capable of receiving address, control and message information, hereafter called "data" which is modulated using preferably 2-level and 4-level frequency modulation techniques. The transmitted data is intercepted by an antenna 1102 which couples to the input of a receiver section 1104. Receiver section 1104 processes the received data in a manner well known in the art, providing at the output an analog 4-level recovered data signal, hereafter called a recovered data signal. The recovered data signal is coupled to one input of a threshold level extraction circuit 1108, and to an input of a 4-level decoder 1110. The threshold level extraction circuit 1108 is best understood by referring to FIG. 12, and as shown comprises two clocked level detector circuits 1202, 1204 which have as inputs the recovered data signal. Level detector 1202 detects the peak signal amplitude value and provides a high peak threshold signal which is proportional to the detected peak signal amplitude value, while level detector 1204 detects the valley signal amplitude value and provides a valley threshold signal which is proportional to the detected valley signal amplitude value of the recovered data signal. The level detectors 1202, 1204 signal outputs are coupled to terminals of resistors 1206, 1212, respectively. The opposite resistor terminals 1206, 1212 provide the high threshold output signal (Hi), and the low threshold output signal (Lo), respectively. The opposite resistor terminals 1206, 1212 are also coupled to terminals of resistors 1208, 1210, respectively. The opposite resistor 1208, 1210 terminals are coupled together to form a resistive divider which provides an average threshold output signal (Avg) which is proportional to the average value of the recovered data signal. Resistors 1206, 1212 have resistor values preferably of 1 R, while resistors 1208, 1210 have resistor values preferably of 2 R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 1214 is preset through a control input (center sample) to select a 128X clock, i.e. a clock having a frequency equivalent to 128 times the slowest data bit rate, which as described above is 1600 bps. The 128X clock is generated by 128X clock generator 1144, as shown in FIG. 11, which is preferably a crystal controlled oscillator operating at 204.8 KHz (kilohertz). The output of the 128X clock generator 1144 couples to an input of frequency divider 1146 which divides the output frequency by two to generate a 64X clock at 102.4 KHz. Returning to FIG. 12, the 128X clock allows the level detectors 1202, 1204 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 1116 generates a second control signal (Center Sample) to enable selection of a 1X symbol clock which is generated by symbol synchronizer 1112 as shown in FIG. 11.

Figure 13:
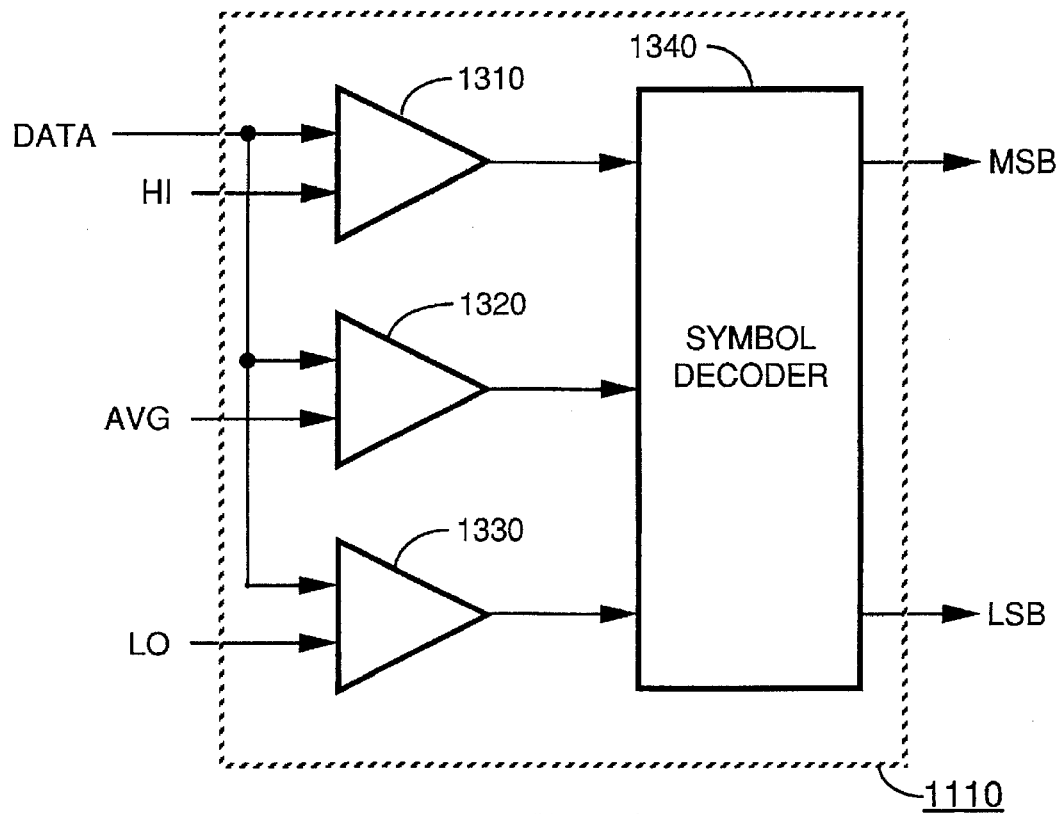
FIG. 13 is an electrical block diagram of a 4-level decoder utilized in the data communication receiver of FIG. 11.

Returning to FIG. 11, the 4-level decoder 1110 operation is best understood by referring to FIG. 13. As shown, the 4-level decoder 1110 comprises three voltage comparators 1310, 1320, 1330 and a symbol decoder 1340. The recovered data signal couples to an input of the three comparators 1310, 1320, 1330. The high threshold output signal (Hi) couples to the second input of comparator 1310, the average threshold output signal (Avg) couples to the second input of comparator 1320, and the low threshold output signal (Lo) couples to the second input of comparator 1330. The outputs of the three comparators 1310, 1320, 1330 couple to inputs of symbol decoder 1340. The symbol decoder 1340 decodes the inputs according to the table provided below.

| Threshold | | | Output | |
|---|---|---|---|---|
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} >$ | $RC_{in} >$ | 1 | 1 |
| $RC_{in} >$ | $RC_{in} >$ | $RC_{in} >$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 1110 is coupled to an input of the symbol synchronizer 1112 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 14:
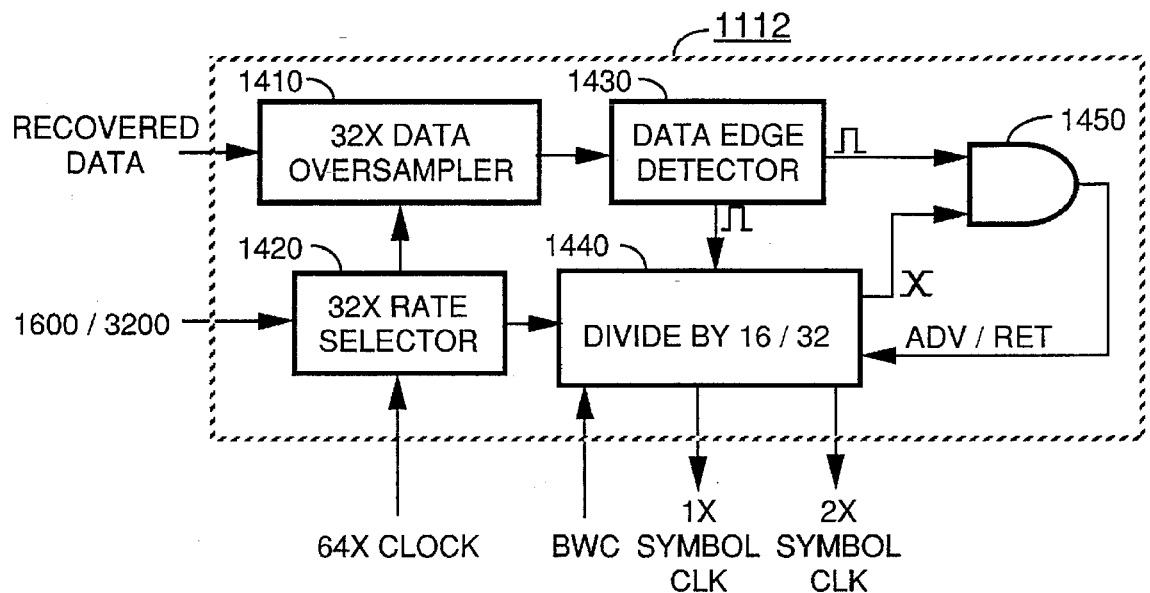
FIG. 14 is an electrical block diagram of a symbol synchronizer utilized in the data communication receiver of FIG. 11.

The operation of the symbol synchronizer 1112 is best understood by referring to FIG. 14. The 64X clock at 102.4 KHz which is generated by frequency divider 1146, is coupled to an input of a 32X rate selector 1420. The 32X rate selector 1420 is preferably a divider which provides selective division by one or two to generate a sample clock which is thirty-two times the symbol transmission rate. A control signal (1600/3200) is coupled to a second input of the 32X rate selector 1420, and is used to select the sample clock rate for symbol transmission rates of 1600 and 3200 symbols per second. The selected sample clock is coupled to an input of 32X data oversampler 1410 which samples the recovered data signal (MSB) at thirty-two samples per symbol. The symbol samples are coupled to an input of a data edge detector 1430 which generates an output pulse when a symbol edge is detected. The sample clock is also coupled to an input of a divide-by-16/32 circuit 1440 which is utilized to generate 1X and 2X symbol clocks synchronized to the recovered data signal. The divided-by-16/32 circuit 1440 is preferably an up/down counter. When the data edge detector 1430 detects a symbol edge, a pulse is generated which is gated by AND gate 1450 with the current count of divide-by-16/32 circuit 1440. Concurrently, a pulse is generated by the data edge detector 1430 which is also coupled to an input of the divide-by-16/32 circuit 1440. When the pulse coupled to the input of AND gate 1450 arrives before the generation of a count of thirty-two by the divide-by-16/32 circuit 1440, the output generated by AND gate 1450 causes the count of divide-by-16/32 circuit 1440 to be advanced by one count in response to the pulse which is coupled to the input of divide-by-16/32 circuit 1440 from the data edge detector 1430, and when the pulse coupled to the input of AND gate 1450 arrives after the generation of a count of thirty-two by the divide-by-16/32 circuit 1440, the output generated by AND gate 1450 causes the count of divide-by-16/32 circuit 1440 to be retarded by one count in response to the pulse which is coupled to the input of divide-by-16/32 circuit 1440 from the data edge detector 1430, thereby enabling the synchronization of the 1X and 2X symbol clocks with the recovered data signal. The symbol clock rates generated are best understood from the table below.

| Input Clock (Relative) | Control Input (sps) | Rate Selector Divide Ratio | Rate Selector Output | 2X Symbol Clock (bps) | 1X Symbol Clock (bps) |
|---|---|---|---|---|---|
| 64X | 1600 | by 2 | 32X | 3200 | 1600 |
| 64X | 3200 | by 1 | 64X | 6400 | 3200 |

As shown in the table above, the 1X and 2X symbol clocks are generated at 1600, 3200 and 6400 bits per second and are synchronized with the recovered data signal.

Figure 15:
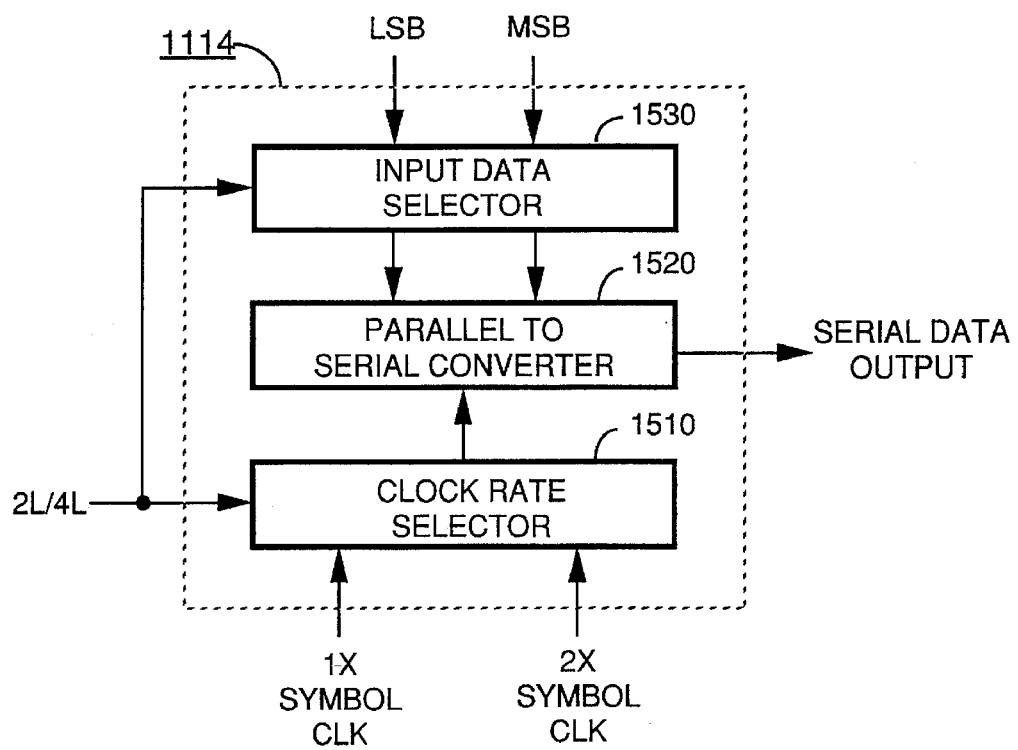
FIG. 15 is an electrical block diagram of a 4-level to binary converter utilized in the data communication receiver of FIG. 11.

The 4-level binary converter 1114 is best understood by referring to FIG. 15. The 1X symbol clock is coupled to a first clock input of a clock rate selector 1510. A 2X symbol clock also couples to a second clock input of the clock rate selector 1510. The symbol output signals (MSB, LSB) are coupled to inputs of an input data selector 1530. A selector signal (2L/4L) is coupled to a selector input of the clock rate selector 1510 and the selector input of the input data selector 1530, and provides control of the conversion of the symbol output signals as either 2-level FSK data, or 4-level FSK data. When the 2-level FSK data conversion (2L) is selected, only the MSB output is selected which is coupled to the input of a parallel to serial converter 1520. The 1X clock input is selected by clock rate selector 1510 which results in a single bit binary data stream to be generated at the output of the parallel to serial converter 1520. When the 4-level FSK data conversion (4L) is selected, both the LSB and MSB outputs are selected which are coupled to the inputs of the parallel to serial converter 1520. The 2X clock input is selected by clock rate selector 1510 which results in a serial two bit binary data stream to be generated at 2X the symbol rate, which is provided at the output of the parallel to serial converter 1520.

Returning to FIG. 11, the serial binary data stream generated by the 4-level to binary converter 1114 is coupled to inputs of a synchronization word correlator 1118 and a demultiplexer 1120. The synchronization word correlator is best understood with reference to FIG. 16. Predetermined "A" word synchronization patterns are recovered by the controller 1116 from a code memory 1122 and are coupled to an "A" word correlator 1610. When the synchronization pattern received matches one of the predetermined "A" word synchronization patterns within an acceptable margin of error, an "A" or "A-bar" output is generated and is coupled to controller 1116. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1620 which decodes the frame word and provides an indication of the frame number currently being received by the controller 1116. During sync acquisition, such as following initial receiver turn-on, power is supplied to the receiver portion by battery saver circuit 1148, shown in FIG. 11, which enabled the reception of the "A" synchronization word, as described above, and which continues to be supplied to enable processing of the remainder of the synchronization code. The controller 1116 compares the frame number currently being received with a list of assigned frame numbers stored in code memory 1122. After receipt of a temporary assignment of a group call address in accordance with the present invention, the frame assigned for receipt of the group call message becomes an assigned frame of the receiver temporarily, and is accessed along with the list of assigned frame numbers stored in the code memory 1122 as described hereinbelow. Should the currently received frame number differ from an assigned frame numbers, the controller 1116 generates a battery saving signal which is coupled to an input of battery saver circuit 1148, suspending the supply of power to the receiver portion. The supply of power will be suspended until the next frame assigned to the receiver, at which time a battery saver signal is generated by the controller 1116 which is coupled to the battery saving circuit 1148 to enable the supply of power to the receiver portion to enable reception of the assigned frame.

Figure 16:
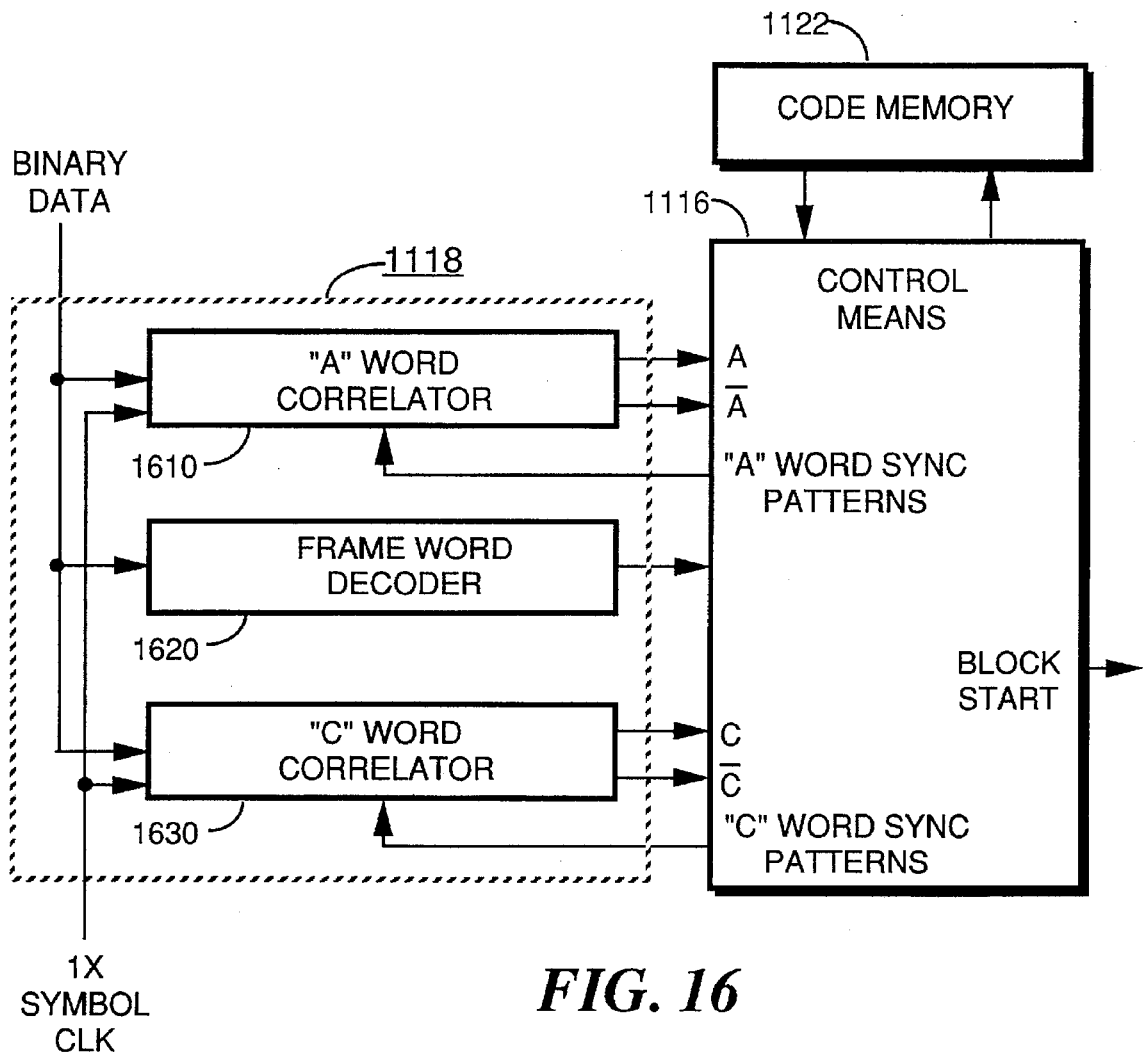
FIG. 16 is an electrical block diagram of a synchronization correlator utilized in the data communication receiver of FIG. 11.

Returning to the operation of the synchronization correlator shown in FIG. 16, a predetermined "C" word synchronization pattern is recovered by the controller 1116 from a code memory 1122 and is coupled to a "C" word correlator 1630. When the synchronization pattern received matches the predetermined "C" word synchronization pattern with an acceptable margin of error, a "C" or "C-bar" output is generated which is coupled to controller 1116. The particular "C" or "C-bar" synchronization word correlated provides "fine" frame synchronization to the start of the data portion of the frame.

Figure 17:
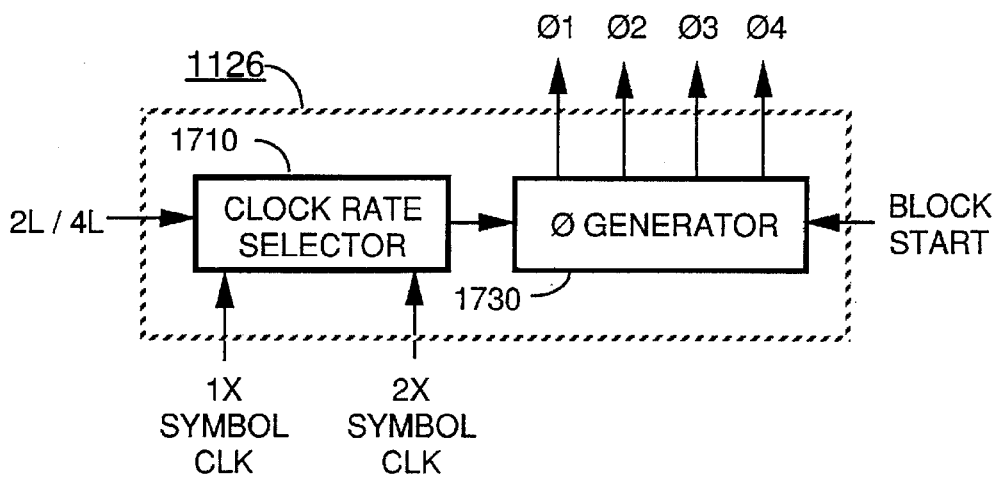
FIG. 17 is an electrical block diagram of a phase timing generator utilized in the data communication receiver of FIG. 11.

Returning to FIG. 11, the start of the actual data portion is established by the controller 1116 generating a block start signal (Blk Start) which is coupled to inputs of a word de-interleaver 1124 and a data recovery timing circuit 1126. The data recovery timing circuit 1126 is best understood by referring to FIG. 17. A control signal (2L/4L) is coupled to an input of clock rate selector 1710 which selects either 1X or 2X symbol clock inputs. The selected symbol clock is coupled to the input of a phase generator 1730 which is preferably a clocked ring counter which is clocked to generate four phase output signals ($\phi 1-\phi 4$). A block start signal is also coupled to an input of the phase generator 1730, and is used to hold the ring counter in a predetermined phase until the actual decoding of the message information is to begin. When the block start signal releases the phase generator 1730, the phase generator 1730 begins generating clocked phase signals which are synchronized with the incoming message symbols.

Referring back to FIG. 11, the clocked phase signal outputs are coupled to inputs of a phase selector 1128. During operation, the controller 1116 recovers from the code memory 1122, the transmission phase number to which the data communication receiver is assigned. The phase number is transferred to the phase select output ($\phi$ Select) of the controller 1116 and is coupled to an input of phase selector 1128. A phase clock, corresponding to the transmission phase assigned, is provided at the output of the phase selector 1128 and is coupled to clock inputs of the demultiplexer 1120, block de-interleaver 1124, and address and data decoders 1130 and 1132, respectively. The demultiplexer 1120 is used to select the binary bits associated with the assigned transmission phase which are then coupled to the input of block de-interleaver 1124, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of address correlator 1130. The controller 1116 recovers the address patterns assigned to the data communication receiver from the code memory 1122, and couples the patterns to a second input of the address correlator 1130. A table of the predetermined group call addresses (GCA0–GCA7) may be stored in the code memory 1122. The controller 1116 would then additionally recover the address patterns of any activated group call addresses for provision to the second input of the address correlator 1130. When any of the de-interleaved address code words matches any of the address patterns assigned to the data communication receiver within an acceptable margin of error, the message information associated with the address is then decoded by the data decoder 1132 and stored in a message memory 1150 in a manner well known to one of ordinary skill in the art. Following the storage of the message information, a sensible alert signal is generated by the controller 1116. The sensible alert signal is preferably an audible alert signal, although it will be appreciated that other sensible alert signals, such as tactile alert signals, and visual alert signals can be generated as well. The audible alert signal is coupled by the controller 1116 to an alert driver 1134 which is used to drive an audible alerting device, such as a speaker or a transducer 1136. The user can override the alert signal generation through the use of user input controls 1138 in a manner well known in the art.

Following the detection of an address associated with the data communication receiver, the message information is coupled to the input of data decoder 1132 which decodes the encoded message information into preferably a BCD or ASCII format suitable for storage and subsequent display. The stored message information can be recalled by the user using the user input controls 1138 whereupon the controller 1116 recovers the message information from memory, and provides the message information to a display driver 1140 for presentation on a display 1142, such as an LCD display.

Figure 18:
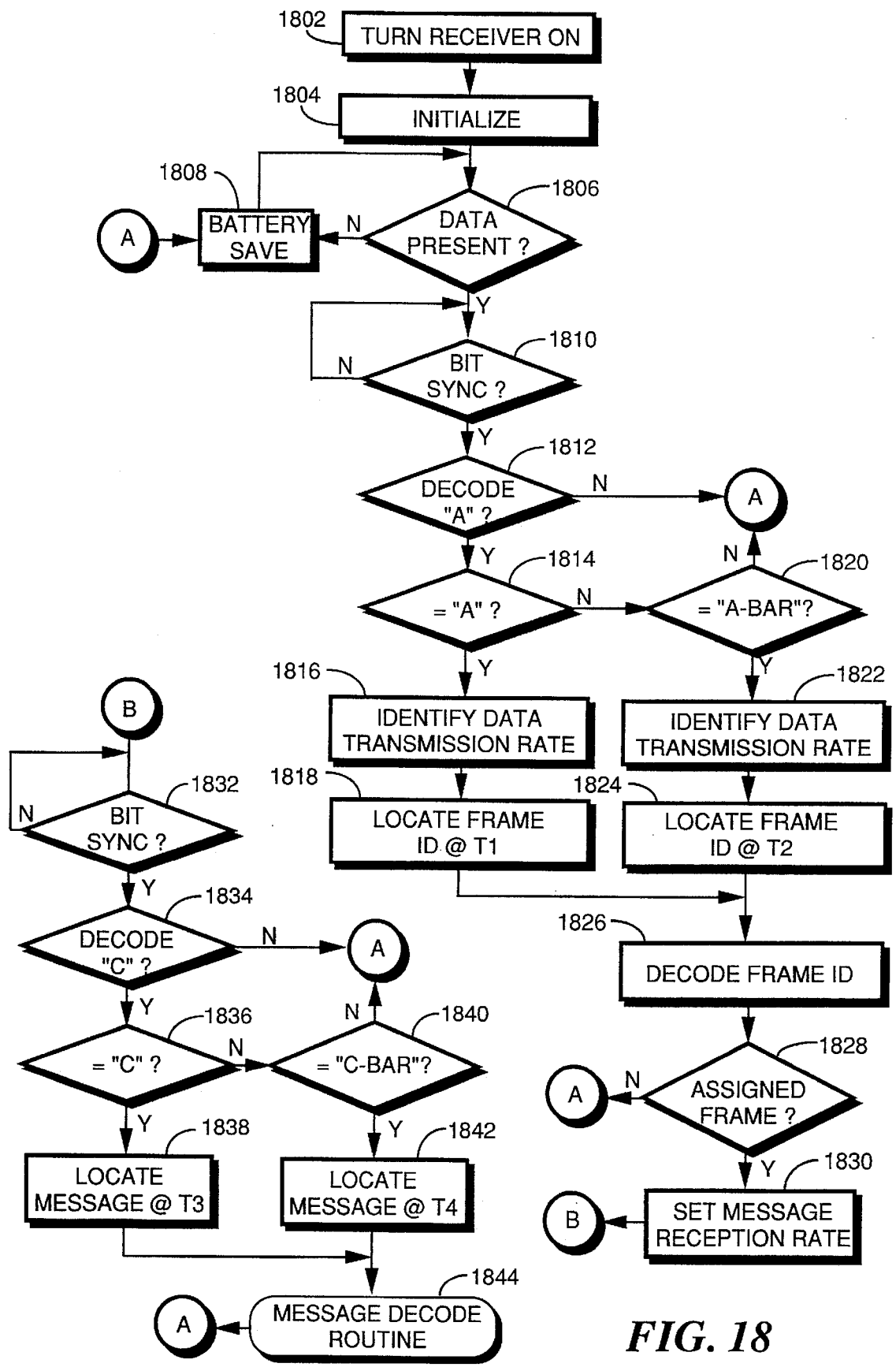
FIGS. 18 and 19 are a flow chart illustrating the data receive and decode operation of the controller 1116 in accordance with the preferred embodiment of the present invention.
Figure 19:
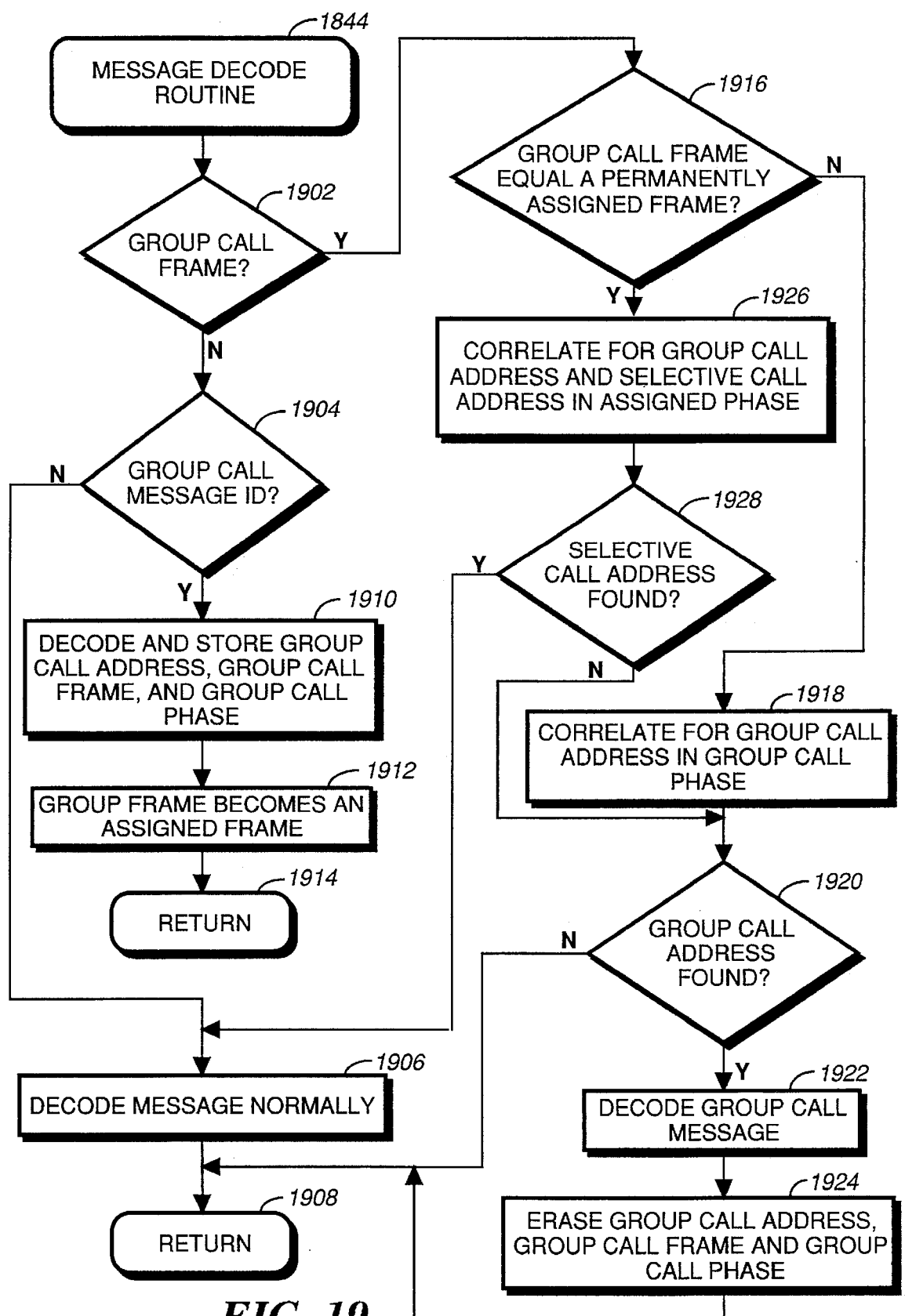

FIGS. 18 and 19 are a flow chart describing the operation of the data communication receiver in accordance with the preferred embodiment of the present invention. At step 1802, when the data communication receiver is turned on, the controller operation is initialized, at step 1804. Power is periodically applied to the receiver portion to enable receiving information present on the assigned RF channel. When data is not detected on the channel in a predetermined time period, battery saver operation is resumed, at step 1808. When data is detected on the channel, at step 1806, the synchronization word correlator begins searching for bit synchronization at step 1810. When bit synchronization is obtained, at step 1810, the "A" word correlation begins at step 1812. When the non-complemented "A" word is detected, at step 1814, the message transmission rate is identified as described above, at step 1816, and because frame synchronization is obtained, the time (T1) to the start of the frame identification code word is identified, at step 1818. When the non-complemented "A" word is not detected, at step 1814, indicating the non-complemented "A" word may have been corrupted by a burst error during transmission, a determination is made whether the complemented "A" bar" is detected, at step 1820. When the "A bar" word is not detected at step 1812, indicating that the "A-bar" word may also have been corrupted by a burst error during transmission, battery saver operation is again resumed, at step 1808. When the "A-bar" word is detected, at step 1820, the message transmission rate is identified as described above, at step 1822, and because frame synchronization is obtained, the time (T2) to the start of the frame identification code word is identified, at step 1824. At the appropriate time, decoding of the frame identification word occurs, at step 1826. When the frame ID detected is not one assigned to the data communication receiver, at step 1828, battery saving is resumed, at step 1808, and remains so until the next assigned frame is to be received. When the decoded frame ID corresponds to an assigned frame ID, at step 1828, the message reception rate is set, at step 1830. An attempt to bit synchronize at the message transmission rate is next made at step 1832. When bit synchronization is obtained, at step 1833, the "C" word correlation begins at step 1834. When the non-complemented "C" word is detected, at step 1836, frame synchronization is obtained, and the time (T3) to the start of the message information is identified, at step 1838.

When the non-complemented "C" word is not detected, at step 1836, indicating the non-complemented "C" word may have been corrupted by a burst error during transmission, a determination is made whether the complement "C bar" is detected, at step 1840. When the "C bar" word is not detected at step 1840, indicating that the "C-bar" word may also have been corrupted by a burst error during transmission, battery saver operation is again resumed, at step 1808. When the "C-bar" word is detected, at step 1840, frame synchronization is obtained, and the time (T4) to the start of the message information is identified, at step 1842. At the appropriate time, message decoding can begin at step 1844.

In accordance with the preferred embodiment of the present invention, the message decoding routine 1844 begins by determining whether the frame in which reception is taking place is an assigned group call frame 1902. If the frame is not a group call frame 1902, the message is decoded and a determination 1904 is made whether a group call message identification code 1030 (FIG. 10) is present within the message portion. If the group call message identification code is not present 1904, the message is decoded in accordance with conventional paging message decoding practices 1906. Processing then returns 1908 to battery save 1808 (FIG. 18) until next data is detected 1806.

If a group call message identification is detected 1904, the group call address 1040, the assigned group call frame 1050, and the assigned group call phase 1060 (FIG. 10) are decoded and stored 1910 in the memory 1122 for use during address correlation. The assigned group frame temporarily becomes 1912 an assigned frame of the data communication receiver. Processing then returns 1914 to battery save 1808 until next data is detected 1806.

Further in accordance with the preferred embodiment of the present invention, when the group call frame is detected 1902, processing determines whether the group call frame equals one of the permanently assigned frames of the data communication receiver 1916. If the group call frame is not one of the permanently assigned frames 1916, address correlation begins 1918 for the group call address by sampling the group call phase as determined from the stored information. If the group call address is not found 1920, processing returns to battery save 1808. A group call address could not be found 1920, when, for example, an additional cycle of the frames of the signaling protocol must occur for all of the data communication receiver in the group to receive the group call address information. Therefore, upon the next occurrence of the group call frame 1902, the group call address will be found 1920.

Alternatively, the system operator could allocate a priority to the group call message such that the frame assigned for transmission of the group call message is the first available frame after all subscribers within the group have received the temporary address assignment message comprising the group call address and frame assignment. Thus, in accordance with the alternative embodiment of the present invention, the first occurrence of the group call frame 1902 will have the group call address therein 1920.

When the group call address is found 1920, the group call message is decoded 1922 and the group call address, group call frame, and group call phase are erased 1924 from the code memory 1122, after which processing returns 1908 to battery save 1808. If the group call message is a long message and therefore comprises multiple messages assigned to multiple frames, the portions of the group call message are decoded 1922 after the group call address is detected 1920 in the multiple frames, and the group call message is thereafter reconstructed by combining the multiple portions thereof. Preferably, the portions of the long group call message are assigned to successive frames. Alternatively, the portions of the long group call message could be assigned to various frames and, perhaps to different phases for each frame. To accommodate different phases, the receiver should have the ability to monitor multiple phases simultaneously within a single frame.

In accordance with the preferred embodiment of the present invention, if the group call frame is a permanently assigned frame of the data communication receiver 1916, the selective call addresses corresponding to the assigned frame and the group call address are correlated for by sampling the phase assigned to the data communication receiver in the group call frame 1926. If the selective call address is found 1928, the message is decoded normally 1906 and processing returns 1908 to battery save 1808. On the other hand, if the selective call address is not found 1928, and the group call address is found 1920, the group call message is decoded 1922 and the group call information (address, assigned frame, and assigned phase) are erased 1924 from the code memory 1122 (FIG. 11) and processing returns 1908 to battery save 1808 until next data is detected 1806. If neither the selective call address 1928 nor the group call address 1920 are found, processing will battery save 1808 until next data is detected 1806.

In summary, the data communication receivers temporarily store the group call address and related information (assigned frame and phase) as an address assigned to the receiver. Thereafter, the address is correlated in the same manner as a predetermined address of the receiver and the address is erased after reception of the group call message. By temporary assignment of the group call address, the present invention provides the air time savings of radio group calling without the associated drawbacks. In addition, the temporary addressing nature of the present invention allows for the advantages of dynamic definition of group membership without the associated use of substantial air time for multiple messaging to multiple receivers.

By now it should be appreciated that there has been provided a method and apparatus for dynamic group calling allowing for the receivers assigned to a group to be easily reassigned while providing substantial savings in air time.

What is claimed is:

1. A method in a selective call receiver receiving a selective call signal, the selective call receiver having at least one selective call address assigned thereto, the method comprising the steps of:

(a) decoding the selective call signal for the at least one assigned selective call address;

(b) decoding a selective call message comprising a group call address in response to decoding of one of the at least one assigned selective call address;

(c) storing the group call address;

(d) decoding the selective call signal for the group call address; and (e) automatically erasing the group call address after receiving a group call message in response to decoding of the group call address.

2. The method of claim 1 wherein the selective call signal comprises a plurality of flees and each of the at least one selective call address corresponds to one of the plurality of frames, and wherein the step (a) of decoding the selective call signal comprises decoding the selective call signal for the at least one assigned selective call address during the one of the plurality of frames corresponding to the at least one assigned selective call address.

3. The method of claim 2 wherein the step (b) of decoding the selective call message comprises decoding a group call address and frame identification information in response to decoding of one of the at least one assigned selective call address, and wherein the step (d) of decoding the selective call signal for the group call address comprises decoding the selective call signal for the group call address during one of the plurality of frames identified by the frame identification information.

4. The method of claim 2 wherein each of the plurality of frames comprises a plurality of phases and each of the at least one selective call address corresponds to one of the plurality of frames and one of the plurality of phases therein, and wherein the step (a) of decoding the selective call signal comprises decoding the selective call signal for the at least one assigned selective call address during the one of the plurality of phases of the one of the plurality of frames corresponding to the at least one assigned selective call address.

5. The method of claim 4 wherein the step (b) of decoding the selective call message comprises decoding a group call address, frame identification information, and phase identification information in response to a successful decoding of one of the at least one assigned selective call address, and wherein the step (d) of decoding the selective call signal for the group call address comprises decoding the selective call signal for the group call address during one of the plurality of phases of one of the plurality of flames, the one of the plurality of frames identified by the frame identification information and the one of the plurality of phases identified by the phase identification information.

6. A selective call receiver having at least one selective call address assigned thereto, the selective call receiver comprising:

receiver circuitry for receiving a selective call signal;

a first memory for storing the at least one selective call address assigned to the selective call receiver;

an address decoder coupled to the first memory means and the receiver means for determining whether the selective call signal comprises signals matches one of the at least one selective call address;

a message decoder coupled to the address decoder for decoding a selective call message in response to the address decoder determining that the selective call signal comprises signals matching one of the at least one selective call address;

a second memory coupled to the message decoder for storing the selective call message; and a controller coupled to the second memory and the address decoder for determining whether the selective call message is a group call address, for providing the group call address to the address decoder as one of the at least one selective call address in response to determining the selective call message is a group call address, and for automatically erasing the group call address from the second memory in response to the address decoder determining that the selective call signal comprises signals matching the group call address.

* * * * *